United States Patent
Kogure et al.

(10) Patent No.: US 12,294,257 B2
(45) Date of Patent: May 6, 2025

(54) ROTATING ELECTRIC MACHINE STATOR MANUFACTURING METHOD

(71) Applicant: HONDA MOTOR CO., LTD., Tokyo (JP)

(72) Inventors: Takayuki Kogure, Tokyo (JP); Kazuya Nagasawa, Tokyo (JP); Kenji Miyanaga, Tokyo (JP); Takafumi Hei, Tokyo (JP); Satoshi Shikata, Tokyo (JP); Hideki Tanaka, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 98 days.

(21) Appl. No.: 18/179,393

(22) Filed: Mar. 7, 2023

(65) Prior Publication Data

US 2023/0318417 A1    Oct. 5, 2023

(30) Foreign Application Priority Data

Mar. 30, 2022   (JP) .................................. 2022-055810

(51) Int. Cl.
| | |
|---|---|
| *B05D 1/00* | (2006.01) |
| *H02K 15/02* | (2006.01) |
| *H02K 15/12* | (2006.01) |

(52) U.S. Cl.
CPC ............. *H02K 15/12* (2013.01); *H02K 15/02* (2013.01)

(58) Field of Classification Search
CPC ....................................................... B05D 1/00
See application file for complete search history.

(56) References Cited

U.S. PATENT DOCUMENTS

| | | | | |
|---|---|---|---|---|
| 4,132,460 A | * | 1/1979 | Porta ...................... | H02K 3/522 310/71 |
| 5,686,144 A | * | 11/1997 | Thebault ............... | F16D 69/023 427/430.1 |
| 2004/0265730 A1 | * | 12/2004 | Takahashi ............. | G03F 7/0047 430/311 |

(Continued)

FOREIGN PATENT DOCUMENTS

| | | |
|---|---|---|
| JP | 2006187059 A | 7/2006 |
| JP | 2012165484 A * | 8/2012 |

(Continued)

OTHER PUBLICATIONS

Notification of Reasons for Refusal issued in the JP Patent Application No. JP2022-055810, mailed on Oct. 3, 2023.

*Primary Examiner* — Kelly M Gambetta
*Assistant Examiner* — Mohammad Mayy
(74) *Attorney, Agent, or Firm* — CKC & Partners Co., LLC

(57) ABSTRACT

There is provided a rotating electric machine stator manufacturing method for forming a resin film on coil film peeled-off portions of a rotating electric machine stator by liquid resin material, the method including: an immersion process of immersing the coil film peeled-off portions of the rotating electric machine stator in the liquid resin material; and a heat curing process of heat curing the liquid resin material after release of the immersing to form the resin film, wherein the liquid resin material has thixotropy; and the immersion process includes a process of causing the rotating electric machine stator to move in a direction other than a vertical direction at least once at least while the coil film peeled-off portions are immersed in the liquid resin material.

6 Claims, 6 Drawing Sheets

(56) References Cited

U.S. PATENT DOCUMENTS

2016/0190891 A1 6/2016 Masugi et al.
2019/0157949 A1 5/2019 Kawai et al.

FOREIGN PATENT DOCUMENTS

| JP | 5728981 B2 | 6/2015 |
| JP | 2016127629 A | 7/2016 |
| JP | 2017189058 A | 10/2017 |
| JP | 2018113794 A | 7/2018 |
| JP | 2019097234 A | 6/2019 |

* cited by examiner

ROTATING ELECTRIC MACHINE STATOR MANUFACTURING METHOD

This application is based on and claims the benefit of priority from Japanese Patent Application No. 2022-055810, filed on 30 Mar. 2022, the content of which is incorporated herein by reference.

BACKGROUND OF THE INVENTION

Field of the Invention

The present invention relates to a rotating electric machine stator manufacturing method.

Related Art

A stator of a rotating electric machine is in a state in which a resin film on end portions of conductors of stator coils is peeled off to connect the end portions of the conductors. On coil film peeled-off portions from which the resin film is peeled off, a resin film is formed, and the coil film peeled-off portions are insulated after being connected. As a method for forming the resin film on the coil film peeled-off portions, a powder resin coating method is known in which the end portions of the conductors that are preheated in advance are immersed in powder resin, and the powder resin is caused to adhere to the coil film peeled-off portions by being melted. In this method, however, it is necessary to heat workpieces (the conductors) in advance, and it is difficult to form a homogeneous coating on the coil film peeled-off portions because the permeability of the powder resin into small parts such as gaps, steps and edge parts is bad.

Therefore, a technology using resin material in liquid form instead of powder resin has been conventionally proposed (see, for example, Japanese Patent No. 5728981). In the conventional technique, the end portions of the conductors are immersed in resin material in liquid form with a high gel reactivity; the resin material near the immersed tip portions is heated to be gelled, by electrifying the conductors; and the gelled part is heat-cured after release of the immersing. In this conventional technology, by heating and gelling the resin material during the immersion, the resin material is prevented from dripping down by its own weight.
Patent Document 1: Japanese Patent No. 5728981

SUMMARY OF THE INVENTION

In the above conventional technique, however, a process of heating the conductors to gel the resin material while the workpieces are immersed in the liquid resin material is required. Therefore, in the above conventional technology, workability deteriorates; and, since it is necessary to add a heating facility to manufacturing facilities, not only facility costs and energy costs but also a facility installation space is required.

An object of the present invention is to provide a rotating electric machine stator manufacturing method capable of forming a favorable resin film even on small parts of coil film peeled-off portions using liquid resin material and capable of enhancing workability.

(1) A rotating electric machine stator manufacturing method according to the present invention is a rotating electric machine stator manufacturing method for forming a resin film (for example, a resin film 124 described later) on coil film peeled-off portions (for example, coil film peeled-off portions 122 described later) of a rotating electric machine stator (for example, a rotating electric machine stator 1 described later) by liquid resin material (for example, liquid resin material 3 described later), the method including: an immersion process of immersing the coil film peeled-off portions of the rotating electric machine stator in the liquid resin material; and a heat curing process of heat curing the liquid resin material after release of the immersing to form the resin film, wherein the liquid resin material has thixotropy; and the immersion process includes a process of causing the rotating electric machine stator to move in a direction other than a vertical direction at least once at least while the coil film peeled-off portions are immersed in the liquid resin material.

(2) In the rotating electric machine stator manufacturing method according to (1) above, in the immersion process, the moving of the rotating electric machine stator in the direction other than the vertical direction may be a rotational movement around a rotation axis along the vertical direction.

(3) In the rotating electric machine stator manufacturing method according to (1) or (2) above, in the immersion process, a movement speed of the rotating electric machine stator in the vertical direction may be changed while the coil film peeled-off portions are immersed in the liquid resin material.

(4) The rotating electric machine stator manufacturing method according to any of (1) to (3) above may include a preheating process of preheating the coil film peeled-off portions to be of a temperature higher than normal temperature before the immersion process.

According to (1) above, by causing the rotating electric machine stator to move in the direction other than the vertical direction at least once at least while the coil film peeled-off portions are immersed in the liquid resin material, a shear rate is given to the liquid resin material having thixotropy. Therefore, the shear viscosity of the liquid resin material decreases, and it is possible to hasten permeation of the liquid resin material into small parts of the coil film peeled-off portions. In the state in which the immersion is released, the shear viscosity of the liquid resin material increases, and, thereby, a coating with an appropriate thickness can be formed on the coil film peeled-off portions, and occurrence of liquid dripping is prevented. Since it is not necessary to heat the liquid resin material in the immersion process to prevent liquid dripping, it is possible to form the favorable resin film even in the small parts of the coil film peeled-off portions using the liquid resin material, and the workability is enhanced. Further, since it is not necessary to cause the liquid resin material to flow or the like at the time of immersing the coil film peeled-off portions in the liquid resin material, a facility for coating can be small-sized. Since an apparatus similar to an apparatus for coating of powder resin can be used for the heat curing process, it is also possible to use an existing facility for coating of powder resin as it is.

According to (2) above, by causing the rotating electric machine stator to rotationally move around the rotation axis along the vertical direction, it is possible to, in the immersion process, decrease the shear viscosity of the liquid resin material having thixotropy, effectively hasten permeation into the small parts of the coil film peeled-off portions, and further enhance permeability into the small parts of the coil film peeled-off portions.

According to (3) above, by causing the movement speed in the vertical direction to change, it is possible to, in the immersion process, decrease the shear viscosity of the liquid resin material having thixotropy, effectively hasten permeation into the small parts of the coil film peeled-off portions, and further enhance the permeability into the small parts of the coil film peeled-off portions.

According to (4) above, by preheating the coil film peeled-off portions to be of a temperature higher than normal temperature before the immersion process, it is possible to, at the time of immersing the coil film peeled-off portions in the liquid resin material, decrease the shear viscosity of the liquid resin material, effectively hasten permeation into the small parts of the coil film peeled-off portions, and further enhance the permeability into the small parts of the coil film peeled-off portions.

DETAILED DESCRIPTION OF THE INVENTION

Figure 1:
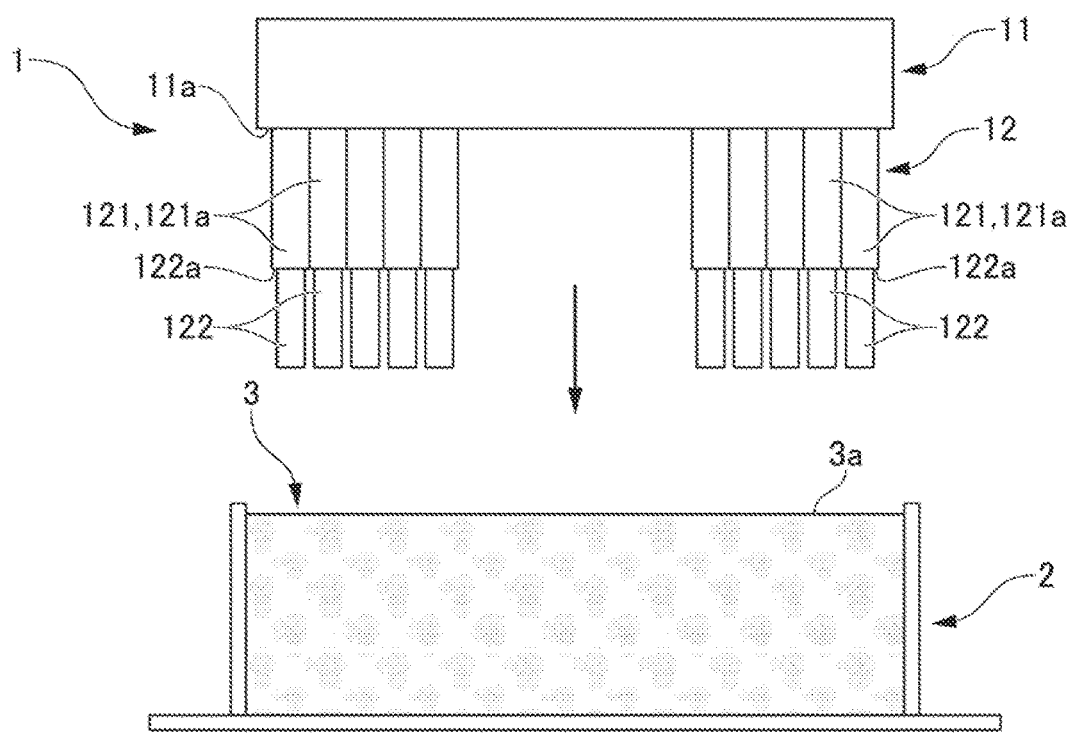
FIG. 1 is a schematic diagram showing a state before a rotating electric machine stator is immersed in liquid resin material.
Figure 5:
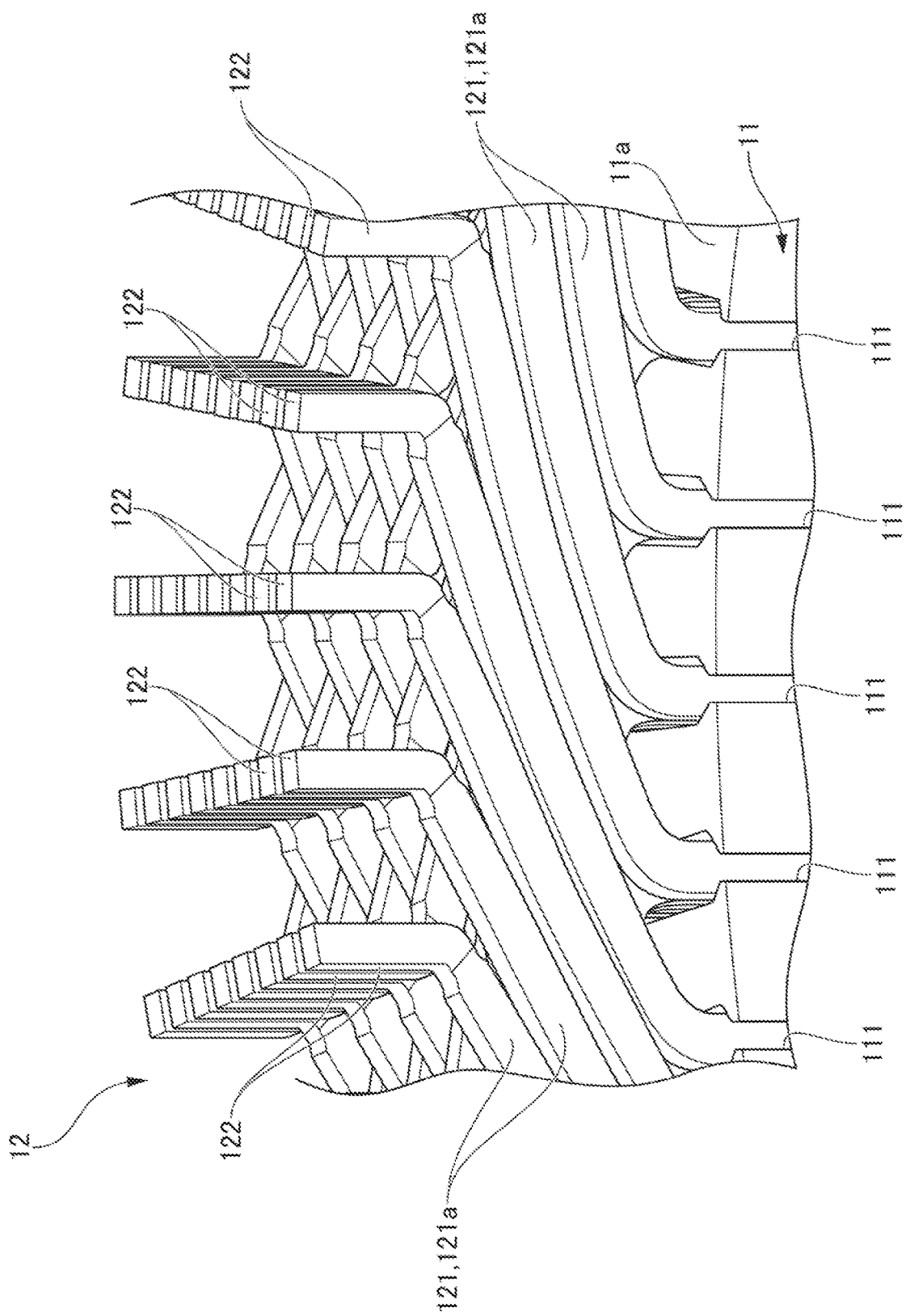
FIG. 5 is a perspective view showing the coil film peeled-off portions of the rotating electric machine stator.

An embodiment of the present invention will be described below in detail with reference to drawings. As shown in FIG. 1, a rotating electric machine stator 1 (which may be hereinafter referred to simply as the stator 1) includes a stator core 11, and a coil 12 fitted to the stator core 11. The coil 12 is configured by inserting a plurality of coil conductors 121 in slots 111 (see FIG. 5) of the stator core 11. On surfaces of the coil conductors 121, an insulating film 121a made of resin is formed. Each of the coil conductors 121 constituting the coil 12 shown in the present embodiment is formed by a segment coil molded in a U shape. However, the coil conductors 121 are not limited thereto. Each of the coil conductors 121 may be formed by a wave-wound coil that is long in the circumferential direction of the stator core 11.

Figure 2:
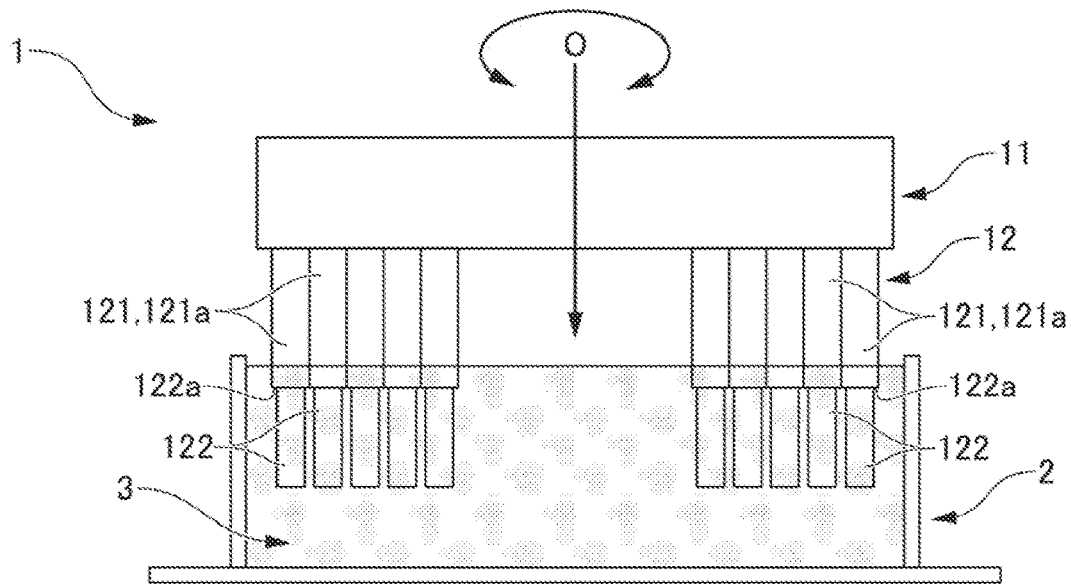
FIG. 2 is a schematic diagram showing an immersion process for the rotating electric machine stator in the liquid resin material.
Figure 3:
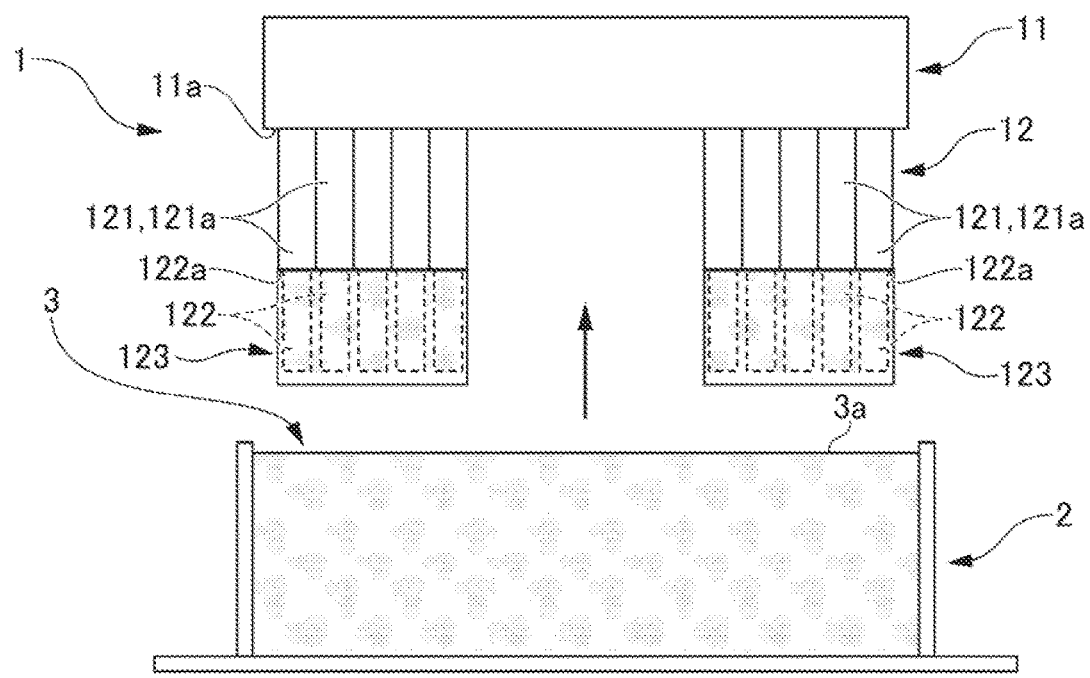
FIG. 3 is a schematic diagram showing a process of releasing the rotating electric machine stator from the immersion in the liquid resin material.

In the stator 1, the end portions of the coil conductors 121 protrude from one end face 11a of the stator core 11 along a central axis O extending along the vertical direction. The end portions of the coil conductors 121 have coil film peeled-off portions 122 from which the insulating film 121a is peeled off. In FIGS. 1 to 3, the stator 1 is in a state in which the coil film peeled-off portions 122 of the coil 12 are arranged to face downward in the vertical direction.

In FIG. 1, a liquid resin storage tank 2 is arranged below the stator 1. The liquid resin storage tank 2 is a cylindrical tank with the top open and with a diameter larger than the outer diameter of the coil 12 protruding from the stator core 11. Inside the liquid resin storage tank 2, liquid resin material 3 is stored.

The liquid resin material 3 is for forming a coating on the end portions of the coil conductors 121 of the coil 12 of the stator 1, which are workpieces, to form an insulating resin film made of the liquid resin material 3 on parts including the coil film peeled-off portions 122 and peripheral parts thereof.

The liquid resin material 3 stored in the liquid resin storage tank 2 has thixotropy. More specifically, the liquid resin material 3 has such viscosity characteristics that the shear viscosity is high when the shear rate is low or at the time of being still when the shear rate is not given, and the shear viscosity becomes lower than the shear viscosity at the time of being still by the liquid resin material 3 being given the shear rate, as indicated by a solid line in FIG. 8. The shear viscosity of the liquid resin material 3, however, does not exceed the viscosity at which the liquid surface in the liquid resin storage tank 2 becomes smooth and does not become below the viscosity at which the liquid resin material 3 does not drip down both when the shear rate is low and when the shear rate is high. The liquid resin material 3 has such a viscosity characteristic that the viscosity is between the viscosity at which the liquid surface becomes smooth and the viscosity at which liquid dripping does not occur, and such a viscosity characteristic that the shear viscosity decreases when the shear rate becomes high while the shear rate is low or at the time of being still when the shear rate is not given.

Figure 8:
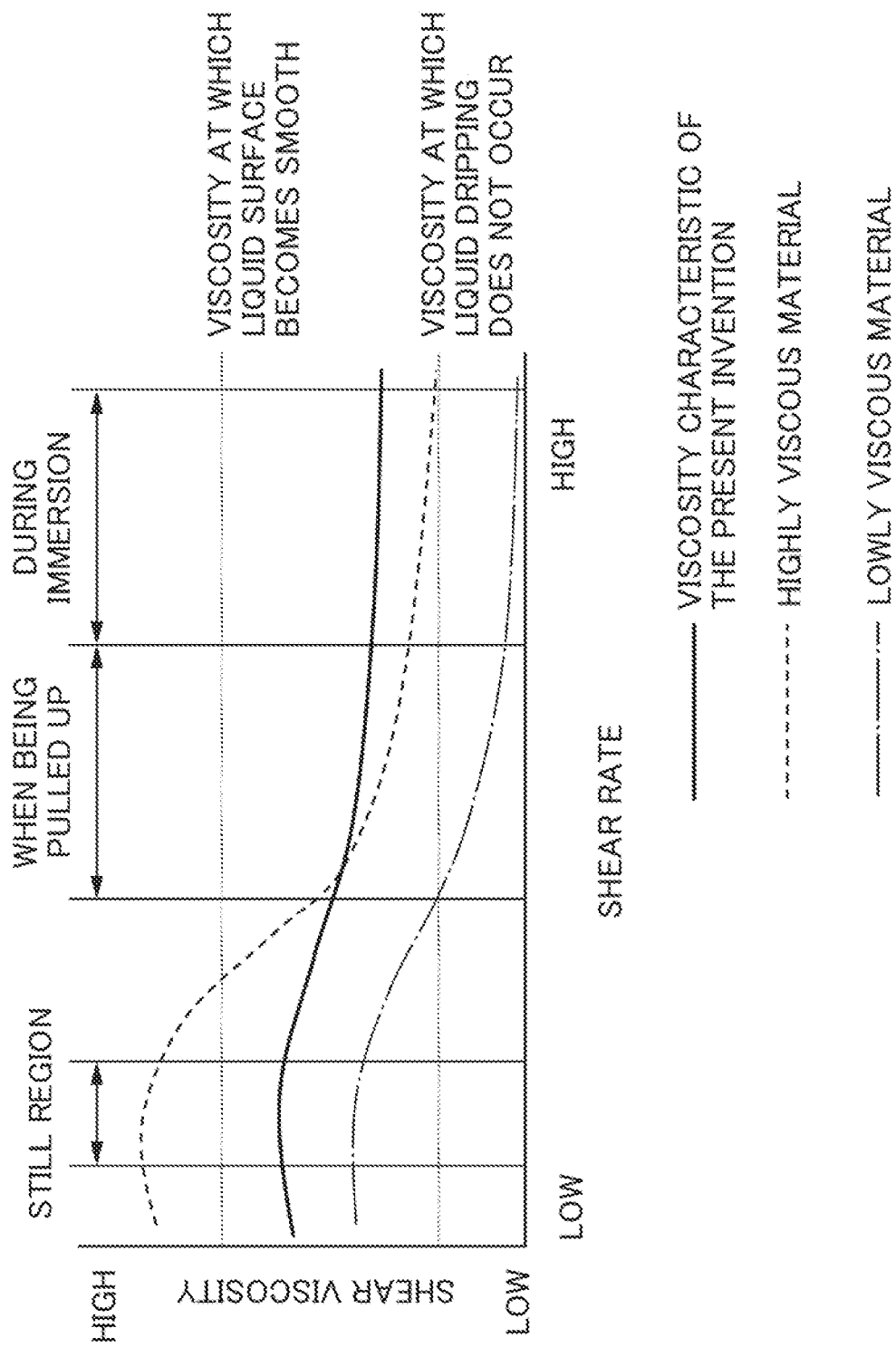
FIG. 8 shows graphs of shear viscosities relative to shear rates of liquid resin materials.

The liquid resin material 3 is composed, for example, by mixing filler as a thixotropy imparting agent for imparting such desired thixotropy as indicated by the solid line in FIG. 8, with a basis including epoxy resin as a principal ingredient.

By mixing an adequate amount of filler into the epoxy resin, a stable state in which behavior of the filler is prevented (a highly thixotropic state) is caused by the van der Waals force working in the filler when the shear rate is low or at the time of being still when the shear rate is not given. At this time, the liquid resin material 3 is into a highly viscous state. When the shear rate is given to the liquid resin material 3 in this highly viscous state, the van der Waals force working in the filler decreases by the input of the rate, and the filler in the liquid resin material 3 is into a state of dynamically changing. Thereby, the liquid resin material 3 is into a lowly viscous state. After that, when the input of the rate is released, the liquid resin material 3 returns to the initial state again and is into the stable state in which the behavior of the filler is prevented by the van der Waals force working in the filler (the highly thixotropic state).

According such liquid resin material 3, the shear viscosity of the liquid resin material 3 does not exceed the viscosity at which the liquid surface becomes smooth and does not become below the viscosity at which liquid dripping does not occur both before the stator 1 is immersed in the liquid resin material 3 and after release of the immersing, as indicated by the solid line in FIG. 8. Therefore, during the immersion, the viscosity of the liquid resin material 3 decreases due to the shear rate being given by movement of the stator 1, and the permeability into small parts of the coil film peeled-off portions 122 is favorable, and, after release of the immersing, the viscosity of the liquid resin material 3 adequately increases, and it is possible to form a coating with an appropriate thickness made of the liquid resin material 3 that has sufficiently permeated even into the small parts of the coil film peeled-off portions 122.

It is favorable that the specific shear viscosity of the liquid resin material 3 is such that simultaneously satisfies the conditions of being equal to or below 530 Pa·s @0.01 (1/s), being equal to or above 4 Pa·s @10 (1/s), and being equal to or below 4 Pa·s @1000 (1/s) at the temperature of 23° C.

The type of the epoxy resin is not especially limited. For example, Bis-F type, Bis-A type, PPG type, or alcohol type can be used.

The filler is not especially limited. For example, calcium carbonate or silica can be used.

In addition to the above, the liquid resin material 3 can include a curing agent or the like for heat curing the liquid resin material 3.

Figure 6:
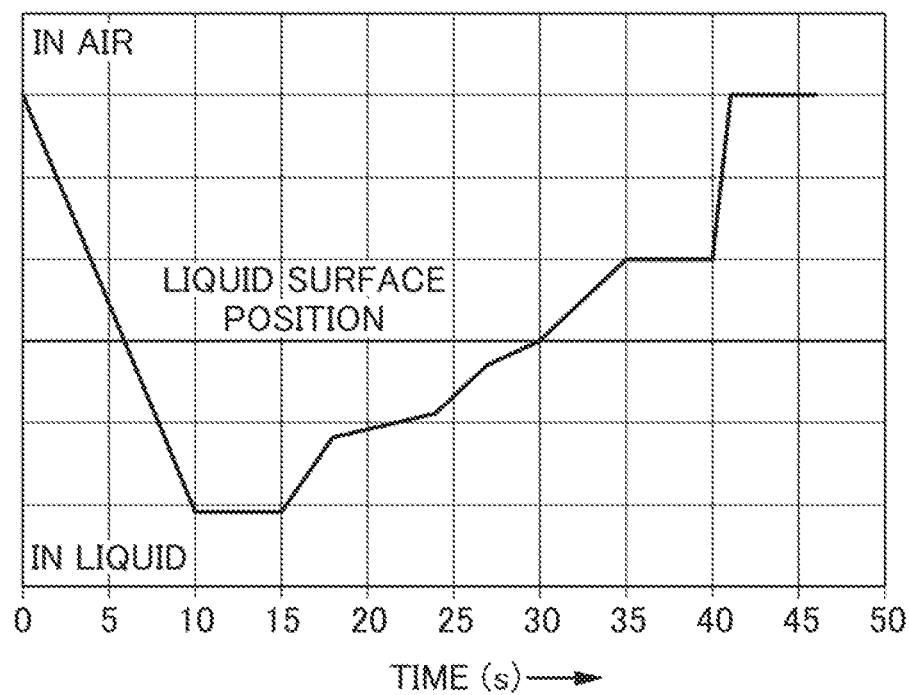
FIG. 6 shows a graph showing a relationship between the position of the coil film peeled-off portions relative to the liquid surface and elapse of time in an immersion process.

Next, a rotating electric machine stator manufacturing method according to the present embodiment will be described with reference to FIGS. 1 to 4, and FIG. 6. FIG. 6 shows a graph showing a relationship between the position of the coil film peeled-off portions 122 relative to a liquid surface 3a and elapse of time. As shown in FIG. 1, the stator 1, which is a workpiece, is arranged in the air above the liquid surface 3a of the liquid resin material 3 stored in the liquid resin storage tank 2, and the coil film peeled-off portions 122 face downward in the vertical direction. The liquid resin material 3 stored in the liquid resin storage tank 2 has been defoamed in advance by applying a vacuum defoaming method, a centrifugal defoaming method, or the like.

First, in the above state, the coil film peeled-off portions 122 of the stator 1 are preheated to be of a higher temperature than normal temperature (a preheating process). Specifically, in the preheating process, the coil film peeled-off portions 122 are preheated, for example, to about 60° C.

As a specific preheating method, a method of electrifying the coil 12 is possible, or a method of applying heat to the coil film peeled-off portions 122 from outside by a heater or the like is also possible. By preheating the coil film peeled-off portions 122, it is possible to, when the coil film peeled-off portions 122 are immersed in the liquid resin material 3 with a relatively high shear viscosity in a still state, in a later immersion process, decrease the shear viscosity of the liquid resin material 3 around the coil film peeled-off portions 122. Thereby, the permeability of the liquid resin material 3 into the small parts such as gaps, steps and edge parts of the coil film peeled-off portions 122, can be enhanced more.

Next, the stator 1 the coil film peeled-off portions 122 of which have been preheated is moved downward in the vertical direction at a predetermined movement speed toward the liquid surface 3a of the liquid resin material 3.

The movement of the stator 1 can be performed, for example, by a robot arm grasping the stator 1 or a movement mechanism (not shown) such as a crane. The movement mechanism can cause the stator 1 to move at various speeds upward and downward in the vertical direction along the central axis O of the stator 1. Further, the movement mechanism can also cause the stator 1 to rotationally move at various speeds in any rotational direction with the central axis O of the stator 1 as the center.

After the tips of the coil film peeled-off portions 122 come into contact with the liquid surface 3a (start of immersion), the downward movement of the stator 1 is further continued until all of the coil film peeled-off portions 122 are located below the liquid surface 3a, and border portions 122a between the coil film peeled-off portions 122 and the insulating film 121a reach a predetermined immersion depth that is slightly below the liquid surface 3a (end of the immersion movement) as shown in FIG. 2. Thereby, the parts including all of the coil film peeled-off portions 122 of the stator 1 and the peripheral parts thereof are immersed in the liquid resin material 3 (the immersion process). The movement speed of the stator 1 at this time is constant as shown in FIG. 6.

As indicated by the solid line in FIG. 8, the liquid resin material 3 in a still region before immersion is in a highly thixotropic state because the shear rate is not given, and has a relatively high shear viscosity. However, the liquid surface 3a is kept smooth. When the tips of the coil film peeled-off portions 122 pass through the liquid surface 3a by start of immersion of the coil film peeled-off portions 122, a slight shear rate is given to the liquid resin material 3, and the shear viscosity of the liquid resin material 3 starts to decrease. The shear viscosity of the liquid resin material 3 that has come into contact with the coil film peeled-off portions 122 also decreases by heat of the preheated coil film peeled-off portions 122. Therefore, the liquid resin material 3 easily permeates into the small parts such as gaps, steps and edge parts of the coil film peeled-off portions 122.

In the case of having a higher shear viscosity in the still region where the shear rate is low, or the shear rate is not given, like highly viscous material indicated by a broken line in FIG. 8, the liquid surface of the liquid resin material stored in a liquid resin storage tank is difficult to become smooth. In this case, air bubbles are easily involved at the time of immersing the coil film peeled-off portions 122, and it is not possible to cause the liquid resin material to be sufficiently permeated into the small parts of the coil film peeled-off portions 122.

Here, after the stator 1 starts downward movement, the stator 1 is caused to move in a direction other than the vertical direction from the time immediately before the tips of the coil film peeled-off portions 122 come into contact with the liquid surface 3a until the coil film peeled-off portions 122 reach a predetermined immersion depth.

The direction other than the vertical direction may be any direction other than the vertical direction. Therefore, a direction of obliquely crossing the stator 1 relative to the vertical direction is also possible. From the point of view of not changing the immersion depth of the coil film peeled-off portions 122 in the liquid resin material 3, it is favorable that the direction other than the vertical direction is a rotation direction with a rotation axis along the central axis O of the stator 1 as the center. The rotation direction may be any one of a clockwise direction and a counterclockwise direction, or may be alternately the clockwise direction and the counterclockwise direction. FIG. 2 shows the case of, in the immersion process, causing the stator 1 to rotationally move alternately in the clockwise direction and in the counterclockwise directions, with the central axis O of the stator 1 as the rotation axis. The rotation angle can be, for example, within 180°.

By causing the stator 1 to move in a direction other than the vertical direction, the liquid resin material 3 is sheared by the coil 12 and is given a high shear rate. Therefore, the shear viscosity of the liquid resin material 3 further decreases, being kept between the viscosity at which the liquid surface 3a becomes smooth and the viscosity at which liquid dripping does not occur, as indicated by the solid line in FIG. 8. Thereby, the liquid resin material 3 further shows fluidity, and the permeability of the liquid resin material 3 into the small parts such as gaps, steps and edge parts of the coil film peeled-off portions 122 is further enhanced.

In the case of liquid resin material with a low shear viscosity like a lowly viscous material indicated by a chain line in FIG. 8, the permeability into the small parts of the coil film peeled-off portions 122 increases, but the shear viscosity of the liquid resin material becomes below the viscosity at which liquid dripping does not occur when the shear rate is given to the liquid resin material, so that liquid dripping easily occurs.

The movement of the stator 1 in the direction other than the vertical direction is continued from the time immediately before the tips of the coil film peeled-off portions 122 come into contact with the liquid surface 3a until the coil film peeled-off portions 122 reach the predetermined immersion depth. After a predetermined time elapses after the coil film peeled-off portions 122 reach the predetermined depth (in the present embodiment, after elapse of five seconds), the stator 1 is moved upward in the vertical direction.

At the time of causing the stator 1 to move upward in the vertical direction, it is favorable to cause the movement speed of the stator 1 to change into a plurality of speeds. Specifically, as shown in FIG. 6, the speed (the slope of the graph) of causing the stator 1 to move upward in the vertical direction is not constant, but two or more movement speeds are combined. In the present embodiment, as shown in FIG. 6, the tips of the coil film peeled-off portions 122 leave the liquid surface 3a in fifteen seconds after the upward movement of the stator 1 in the vertical direction starts, and different four movement speeds are combined during the fifteen seconds. The four movement speeds include speeds higher and lower than the downward movement speed of the stator 1 in the vertical direction. Thereby, at the time of the upward movement of the stator 1 in the vertical direction, the permeability of the liquid resin material 3 into the small parts such as the gaps, steps and edge parts of the coil film peeled-off portions 122 can be further enhanced.

It is, however, desirable to cause the upward movement speed of the stator 1 in the vertical direction to be lower than the downward movement speed of the stator 1 in the vertical direction at least immediately before the tips of the coil film peeled-off portions 122 leave the liquid surface 3a. Since, in the state in which the liquid resin material 3 has permeated into the small parts of the coil film peeled-off portions 122, the shear rate given to the liquid resin material 3 decreases, and the shear viscosity of the liquid resin material 3 increases, it is possible to contribute to hastening of formation of a homogeneous coating that has permeated even into the small parts of the coil film peeled-off portions 122. Moreover, by the shear viscosity of the liquid resin material 3 increasing, liquid separation at the time of the tips of the coil film peeled-off portions 122 completely leaving the liquid surface 3a becomes good, and liquid dripping of the liquid resin material 3 is further prevented.

As shown in FIG. 3, the stator 1 is moved upward in the vertical direction until the tips of the coil film peeled-off portions 122 are at a predetermined distance (for example, 2 mm to 10 mm) from the liquid surface 3a, and is stopped at that position. Thereby, the immersion of the coil film peeled-off portions 122 is completely released, and a coating 123 made of the liquid resin material 3 is formed on the parts including the coil film peeled-off portions 122 and the peripheral parts thereof.

Figure 4:
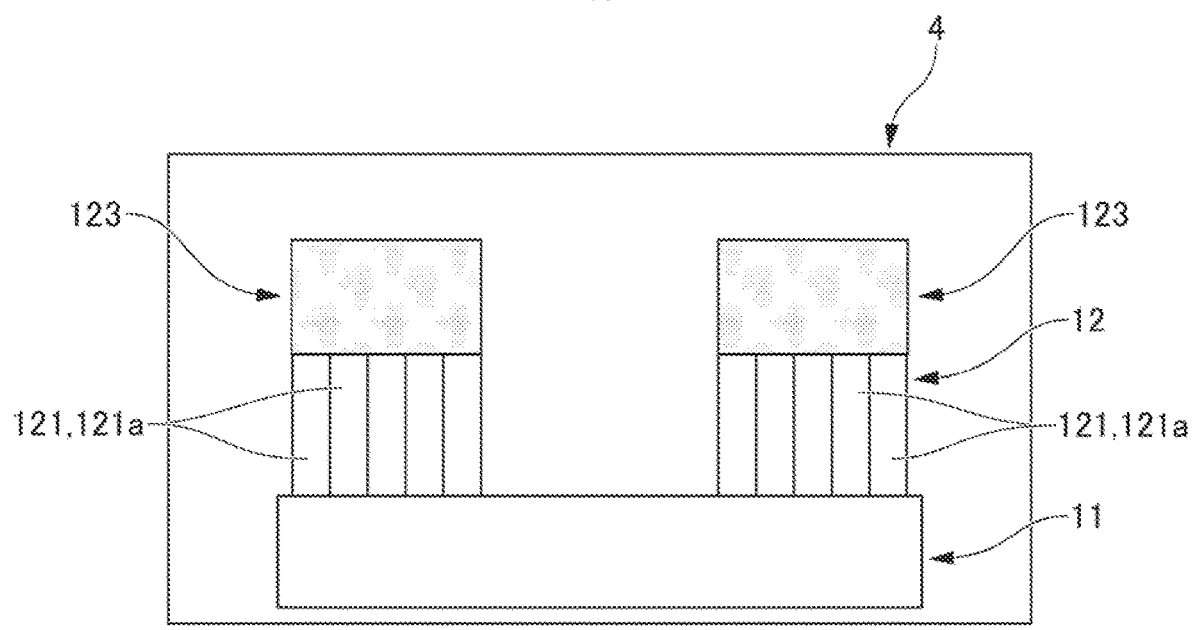
FIG. 4 is a schematic diagram showing a heat curing process of heat curing the liquid resin material adhering to the coil film peeled-off portions of the rotating electric machine stator.

After that, after the stator 1 is further moved upward in the vertical direction up to a predetermined height, the stator 1 is reversed upside down so that the coil film peeled-off portions 122 face upward in the vertical direction, and the stator 1 is contained in a constant temperature tank 4 in that state, as shown in FIG. 4. The constant temperature tank 4 causes the temperature of the stator 1 to increase up to a curing temperature (for example, 180° C.) of the coating 123 adhering to the coil film peeled-off portions 122. Thereby, the stator 1 is heated for a predetermined time (for example, one hour) to heat cure the coating 123 adhering to the coil film peeled-off portions 122 (a heat curing process).

In the heat curing process, since the shear rate is not given to the coating 123 adhering to the coil film peeled-off portions 122 of the stator 1, the coating 123 shows a high shear viscosity. Therefore, liquid dripping does not easily occur even when the stator 1 is reversed upside down to be contained into the constant temperature tank 4.

Figure 7:
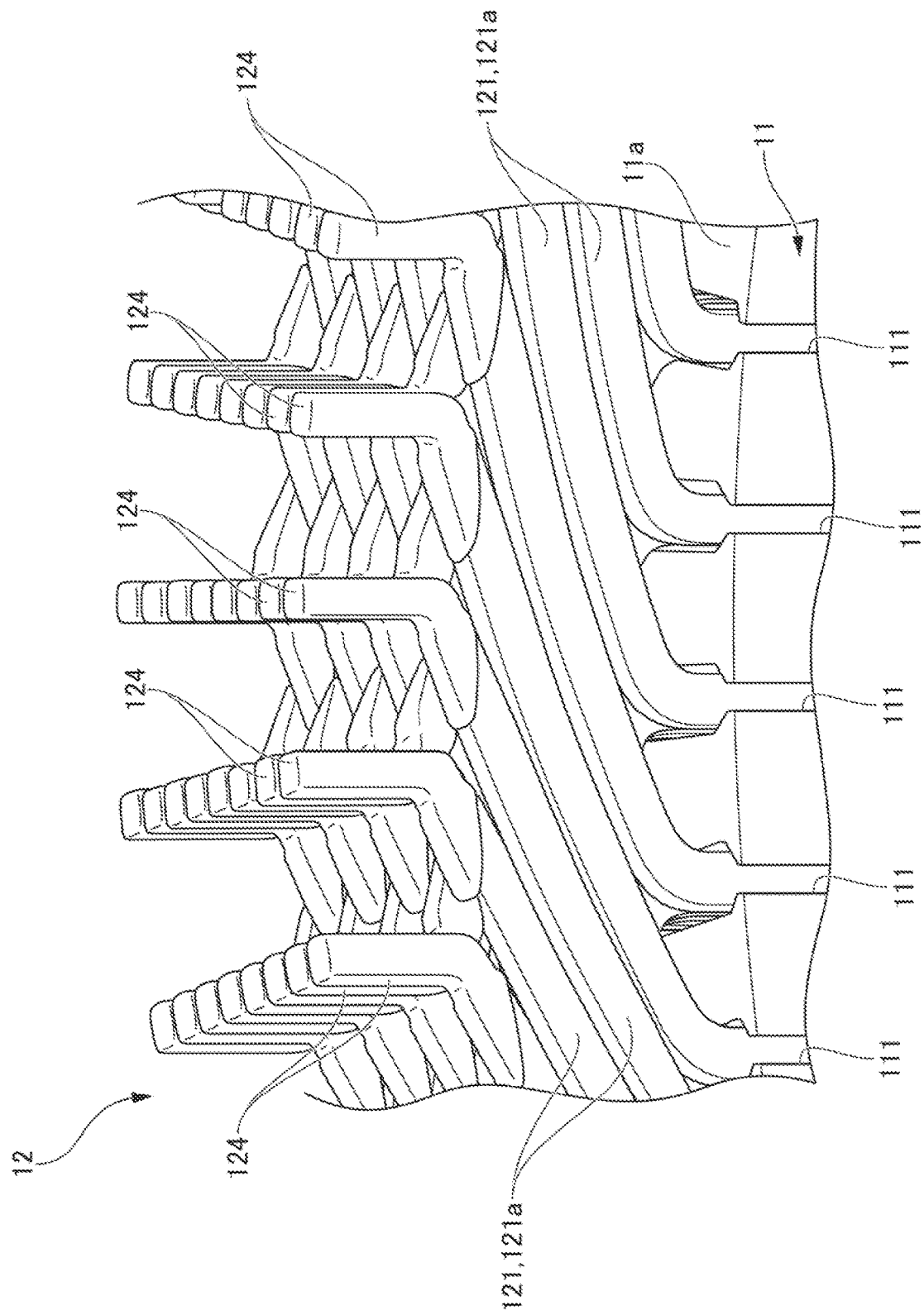
FIG. 7 is a perspective view showing a state in which an insulating film is formed on the coil film peeled-off portions of the rotating electric machine stator.

After the heat curing process ends, the stator 1 is taken out from the constant temperature tank 4 and is naturally cooled. Thereby, a resin film 124, which is the cured coating 123 made of the liquid resin material 3, is formed on the surface of the parts including the coil film peeled-off portions 122 of the stator 1 and the peripheral parts thereof, as shown in FIG. 7. The resin film 124 permeates even into the small parts such as gaps, steps and edge parts of the coil film peeled-off portions 122, and the entire surface of the parts including the coil film peeled-off portions 122 and the peripheral parts thereof is coated with the resin film 124. A part of the resin film 124 reaches the area of the insulating film 121a that is originally formed on the coil conductors 121. Therefore, insulation of the coil 12 is kept.

As described above, according to the rotating electric machine stator manufacturing method according to the present embodiment, the following advantageous effects are obtained. That is, there is provided a rotating electric machine stator 1 manufacturing method for forming a resin film 124 on coil film peeled-off portions 122 of a rotating electric machine stator 1 by liquid resin material 3, and the method including: an immersion process of immersing the coil film peeled-off portions 122 of the rotating electric machine stator 1 in the liquid resin material 3; and a heat curing process of heat curing the liquid resin material 3 after release of the immersing to form the resin film 124, wherein the liquid resin material 3 has thixotropy; and the immersion process includes a process of causing the rotating electric machine stator 1 to move in a direction other than a vertical direction at least once at least while the coil film peeled-off portions 122 are immersed in the liquid resin material 3.

According to the above, by causing the rotating electric machine stator 1 to move in the direction other than the vertical direction at least once at least while the coil film peeled-off portions 122 are immersed in the liquid resin material 3, a shear rate is given to the liquid resin material 3 having thixotropy. Therefore, the shear viscosity of the liquid resin material 3 decreases, and it is possible to hasten permeation of the liquid resin material 3 into the small parts of the coil film peeled-off portions 122. In the state in which the immersion is released, the shear viscosity of the liquid resin material 3 increases, and, thereby, a coating 123 with an appropriate thickness can be formed on the coil film peeled-off portions 122, and occurrence of liquid dripping is prevented. Since it is not necessary to heat the liquid resin material 3 in the immersion process to prevent liquid dripping, it is possible to form the favorable resin film 124 even in the small parts of the coil film peeled-off portions 122 using the liquid resin material 3, and the workability is enhanced. Further, since it is not necessary to cause the liquid resin material 3 to flow or the like at the time of immersing the coil film peeled-off portions 122 in the liquid resin material 3, a facility for coating can be small-sized. Since an apparatus similar to an apparatus for coating of powder resin can be used for the heat curing process, it is also possible to use an existing facility for coating of powder resin as it is.

In the present embodiment, in the immersion process, the moving of the rotating electric machine stator 1 in the direction other than the vertical direction is a rotational movement around a rotation axis along the vertical direction.

According to the above, by causing the rotating electric machine stator 1 to rotationally move around the rotation axis along the vertical direction, it is possible to, in the immersion process, decrease the shear viscosity of the liquid resin material 3 having thixotropy, effectively hasten permeation into the small parts of the coil film peeled-off portions 122, and further enhance permeability into the small parts of the coil film peeled-off portions 122.

In the present embodiment, in the immersion process, a movement speed of the rotating electric machine stator 1 in the vertical direction is changed while the coil film peeled-off portions 122 are immersed in the liquid resin material 3.

According to the above, by causing the movement speed in the vertical direction to change, it is possible to, in the immersion process, decrease the shear viscosity of the liquid resin material 3 having thixotropy, effectively hasten permeation into the small parts of the coil film peeled-off portions 122, and further enhance the permeability into the small parts of the coil film peeled-off portions 122.

In the present embodiment, a preheating process of preheating the coil film peeled-off portions 122 to be of a temperature higher than normal temperature is included before the immersion process.

According to the above, by preheating the coil film peeled-off portions 122 to be of a temperature higher than normal temperature before the immersion process, it is possible to, at the time of immersing the coil film peeled-off portions 122 in the liquid resin material 3, decrease the shear viscosity of the liquid resin material 3 around the coil film peeled-off portions 122, effectively hasten permeation into the small parts of the coil film peeled-off portions 122, and further enhance the permeability into the small parts of the coil film peeled-off portions.

An embodiment of a rotating electric machine stator manufacturing method according to the present invention has been described. The present invention, however, is not limited thereto. Detailed configurations of the rotating electric machine stator manufacturing method may be appropriately changed within the spirit of the present invention.

For example, though movement of the stator 1 in a direction other than the vertical direction (rotational movement) is started immediately before the tips of the coil film peeled-off portions 122 come into contact with the liquid surface 3a and is continued until upward movement of the stator 1 is started in the immersion process in the above embodiment, the present invention is not limited thereto. The movement of the stator 1 in a direction other than the vertical direction only needs to be performed at least once at least while the coil film peeled-off portions 122 are immersed in the liquid resin material 3.

Further, though the movement speed of the stator 1 is changed into a plurality of speeds at the time of causing the stator 1 to move upward in the vertical direction in the above embodiment, the movement speed of the stator 1 may be also changed into a plurality of speeds at the time of causing the stator 1 to move downward in the vertical direction. The process of causing the movement speed of the stator 1 to change into a plurality of speeds may be performed only either when the stator 1 moves upward in the vertical direction or when the stator 1 moves downward in the vertical direction.

EXPLANATION OF REFERENCE NUMERALS

1 Rotating electric machine stator
3 Liquid resin material
122 Coil film peeled-off portion
124 Resin film

What is claimed is:

1. A rotating electric machine stator manufacturing method for forming a resin film on coil film peeled-off portions of a rotating electric machine stator by liquid resin material, the method comprising:
    an immersion process of immersing the coil film peeled-off portions of the rotating electric machine stator in the liquid resin material; and
    a heat curing process of heat curing the liquid resin material after release of the immersing to form the resin film, wherein
    the liquid resin material has thixotropy; and
    the immersion process includes a process of immersing the coil film peeled-off portions in the liquid resin material without heating and causing the rotating electric machine stator to move in a direction other than a vertical direction at least once at least while the coil film peeled-off portions are immersed in the liquid resin material.

2. The rotating electric machine stator manufacturing method according to claim 1, wherein, in the immersion process, the moving of the rotating electric machine stator in the direction other than the vertical direction is a rotational movement around a rotation axis along the vertical direction.

3. The rotating electric machine stator manufacturing method according to claim 1, wherein, in the immersion process, a movement speed of the rotating electric machine stator in the vertical direction is changed while the coil film peeled-off portions are immersed in the liquid resin material.

4. The rotating electric machine stator manufacturing method according to claim 1, further comprising a preheating process of preheating the coil film peeled-off portions at a temperature that lowers the shear viscosity of the liquid resin material, before the immersion process.

5. The rotating electric machine stator manufacturing method according to claim 1, wherein the liquid resin material has a viscosity characteristic that is between a viscosity at which a surface of the liquid resin material becomes smooth and a viscosity at which the dripping does not occur when the coil film peeled-off portions are released after the immersing, and has a thixotropy such that, when a shear rate increases, the shear viscosity decreases from a shear viscosity at a time when the shear rate is low or at a time of being still when no shear rate is applied.

6. The rotating electric machine stator manufacturing method according to claim 5, wherein
    the shear viscosity of the liquid resin material simultaneously satisfies conditions of being equal to or below 530 Pa·s @0.01 (1/s), being equal to or above 4 Pa·s @10 (1/s), and being equal to or below 4 Pa·s @1000 (1/s) at a temperature of 23° C.

* * * * *